July 28, 1953 A. C. BLANEY ET AL 2,647,169

DIRECT POSITIVE SOUND RECORDING

Filed June 22, 1950 2 Sheets-Sheet 1

INVENTORS
ARTHUR C. BLANEY &
KURT SINGER
BY Carl R. Graham
ATTORNEY

DIRECT POSITIVE SOUND RECORDING

Filed June 22, 1950 2 Sheets-Sheet 2

INVENTORS
ARTHUR C. BLANEY &
KURT SINGER
BY [signature]
ATTORNEY

Patented July 28, 1953 2,647,169

UNITED STATES PATENT OFFICE 2,647,169

DIRECT POSITIVE SOUND RECORDING

Arthur C. Blaney, Los Angeles, and Kurt Singer, North Hollywood, Calif., assignors to Radio Corporation of America, a corporation of Delaware Application June 22, 1950, Serial No. 169,696

10 Claims. (Cl. 179—100.3)

This invention relates to sound recording, and particularly to the recording of a photographic, direct positive, variable width sound record which contains a minimum of distortion.

A variable area track is fundamentally nothing more than an oscillographic trace of the original sound wave having all the area on one side of the trace transparent and all the area on the other side of the trace opaque. Although there are various forms of these tracks, such as unilateral, bi-lateral, push-pull, and direct positive, they are all designed to accomplish the same final result. This result is to vary the light intensity reaching the photocell in the reproducer in accordance with the original sound waves. Due to the characteristic of photographic materials, complete opacity and complete transparency are impossible, but it is not difficult to obtain a density contrast that will fit all optical requirements. The reason for a high density contrast is to produce a high ratio of signal-to-noise.

Another requisite of a good variable width sound record is that the silver image must be exactly the same size and shape as the optical image that formed it. It is characteristic of all photographic materials to diffuse the light that penetrates their surfaces. The degree of diffusion varies with different types of emulsions, the wave-length of the exposing light, and the angle at which the light strikes the emulsion. In addition to this, the silver image is also affected in sharpness and size by the type of developer.

The effect of this diffusion on the exposure for any small unit area is that the total exposure on this area is dependent upon the exposure of adjacent areas. It follows, therefore, that the boundary of the silver image lacks sharpness and may be larger or smaller than the optical image. On sound track records where the unit areas are comparatively large, such as the images of the lower frequencies, this image spread is of negligible importance. However, at the higher frequencies, the image spread becomes an important factor.

After taking advantage of all the factors which reduce the image spread, the silver image on a print at the density of 1.4 is larger than the optical image that formed it. Consequently, in order to produce the correct silver image on the print, it is necessary to introduce a compensating effect (image spread) into the negative. That is, the silver image on the negative must be larger, and, therefore, the clear portion smaller by the amount of image spread in this print so that when the negative is printed, the silver image on the print will be exactly the same size and shape as the optical image that exposed the negative.

So far, we have been dealing only with the production of sound records by recording negatives and making prints therefrom, in which a compensating image spread has been introduced into the negative and/or print in order to obtain a final result containing a minimum of distortion. However, when producing a direct positive, variable width, sound record, the possibility of introducing canceling image spreads in the negative and/or print does not exist any more, since the direct positive record itself must correspond to the final product. That is, the direct positive record should correspond to a good print in the negative-positive recording system.

It has been found that it is possible to modify the shape of the optical image in such a manner so that when recording direct positive photographic sound records, the change in optical image can be dimensioned in such a manner as to counteract the distortion introduced by the image spread incurred by the light scatter and processing of the emulsion. While it is known that a direct positive sound record can be made with acceptably low distortion without such corrective measures, its density is too low for practical purposes, since it will be on the order of from 0.6 to 1.0, while a density of at least 1.4 or higher is required to obtain output and freedom from noise.

U. S. Patent No. 2,074,049 of March 16, 1937, describes a system for modulating the light beam in one manner to eliminate this processing distortion. Co-pending application, Ser. No. 112,826, filed August 27, 1949, also describes another system for introducing a predetermined distortion into the instantaneous and average values of the signal wave as impressed upon the light beam modulator. The present invention also has for its primary function a predistortion of the signal wave to reduce the cross modulation products to a minimum. The present invention accomplishes the result by generating a distortion component equal in amplitude and opposite in phase to that contributed by the film emulsion, and then combines the two distortion products so that they cancel each other and the reproduced sound is free from distortion.

The principal object of the invention, therefore, is to facilitate the recording and reproducing of sound.

Another object of the invention is to provide an improved system for generating a predetermined distortion component for combination with the original signal.

A further object of the invention is to provide an improved distortion generator for obtaining a predetermined distortion.

A still further object of the invention is to provide a new and improved type of distortion producing device.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 3, 4, 5:
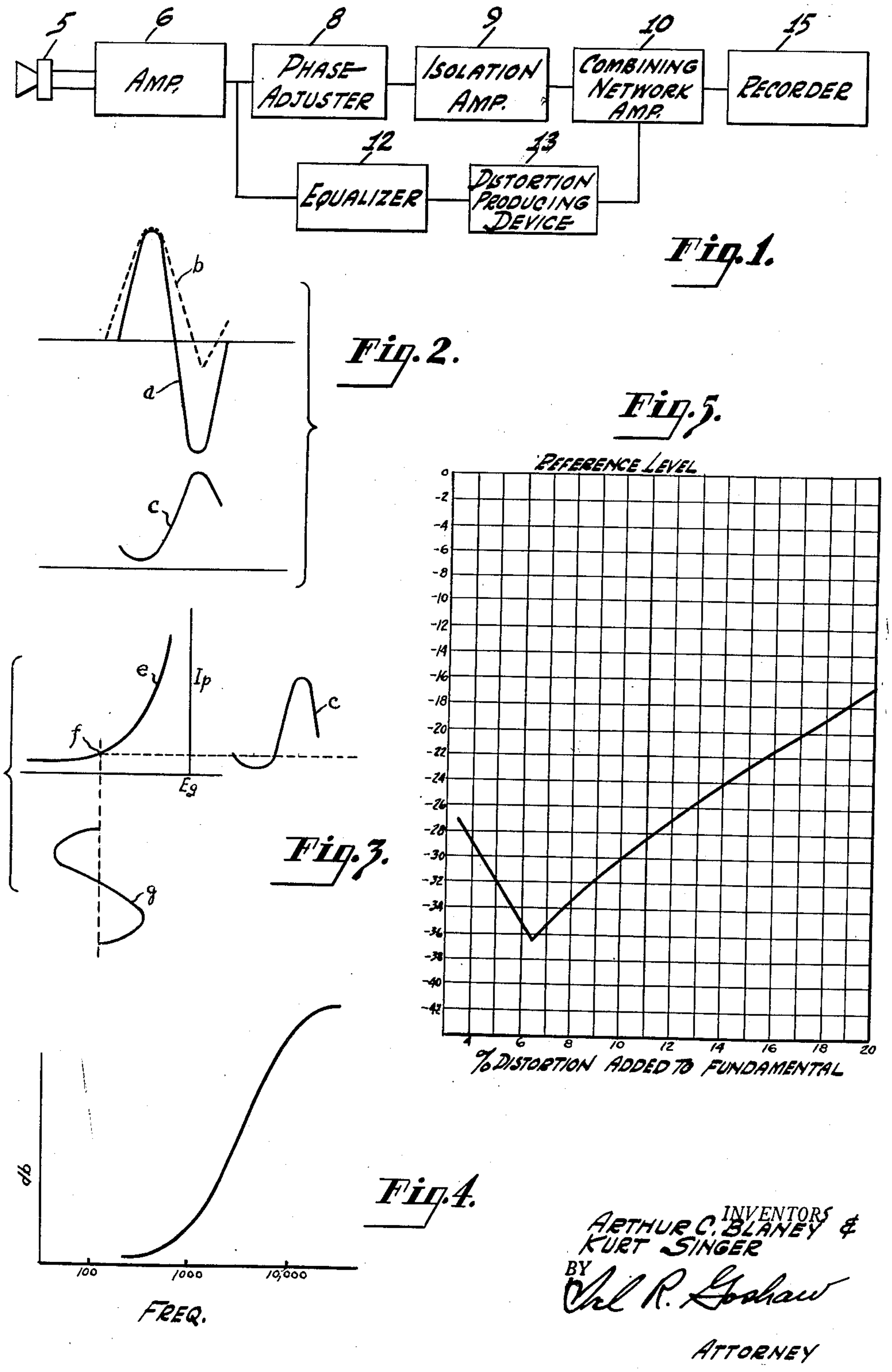
Fig. 1 is a diagrammatic view of a recording system embodying the invention.
Fig. 2 is a diagram of the wave-form and distortion components.
Fig. 3 is a diagram illustrating one method of generating the desired distortion components.
Fig. 4 is a graph showing the characteristic of the equalizer used in the invention.
Fig. 5 shows the magnitude of the distortion in the final record in accordance with the amount of distortion added to the fundamental.

Referring now to the drawings, and particularly referring to Fig. 2, solid line *a* is a sine wave, and dotted line *b* is the wave obtained upon the developed film when the density is higher than "balance density." This frequency may be of the order of 4000 cycles on sixteen millimeter film, which is run at a speed of 7.2 inches per second, or 9000 cycles on thirty-five millimeter film run at a speed of eighteen inches per second. Curve *c* in Fig. 2 is a curve representing the difference between curves *a* and *b*, and is the wave-form which must be added to the signal in opposite phase in order that the original wave may be free from distortion when the film is processed.

The general system for generating and introducing wave *c* into the signal is shown in Fig. 1. In this figure, 5 is a microphone which represents any typical source of sound and which is connected to a pre-amplifier 6. A portion of the output of the amplifier is fed into a phase adjusting network 8 of any suitable type, after which the signal is fed into an isolation amplifier 9 and then into the combining network amplifier 10. The other portion of the output of amplifier 6 is fed into an equalizer 12 and then into distortion producing device 13, the output of which is connected to the combining network amplifier 10. The output of the last mentioned amplifier is then impressed on the modulator in the recorder 15 in the usual manner. The shape of the wave at the output of the device 13 is as shown at *c* in Fig. 2, and this wave is impressed on the combining network for combination with the original signal.

The distortion required must increase with increasing frequency, which means that the characteristic of the equalizer 12 must be as shown in Fig. 4. It is to be noted that the equalizer will pass substantially no signal below 1000 cycles. Its response then increases exponentially up to the maximum frequency of the recording channel, where it is cut off to prevent resonant conditions. The distorting device 13 may be made up of any elements which will produce the desired wave-form.

It is noted in Fig. 2 that distortion takes place over the entire wave and is not symmetrical with respect to positive and negative half cycles. To produce this variation, the equalized signal may be fed into a tube whose characteristic is represented by curve *e* in Fig. 3, which is the plate current grid voltage characteristic of the tube. If this tube is biased to the point *f* on its characteristic *e*, then a sine wave *g*, transmitted by this tube, will have the required wave shape as shown at *c* in Fig. 3. This wave is then added in the proper amount to the original signal in the network 10 and the phase of the original signal adjusted until minimum distortion is obtained.

Figure 6:
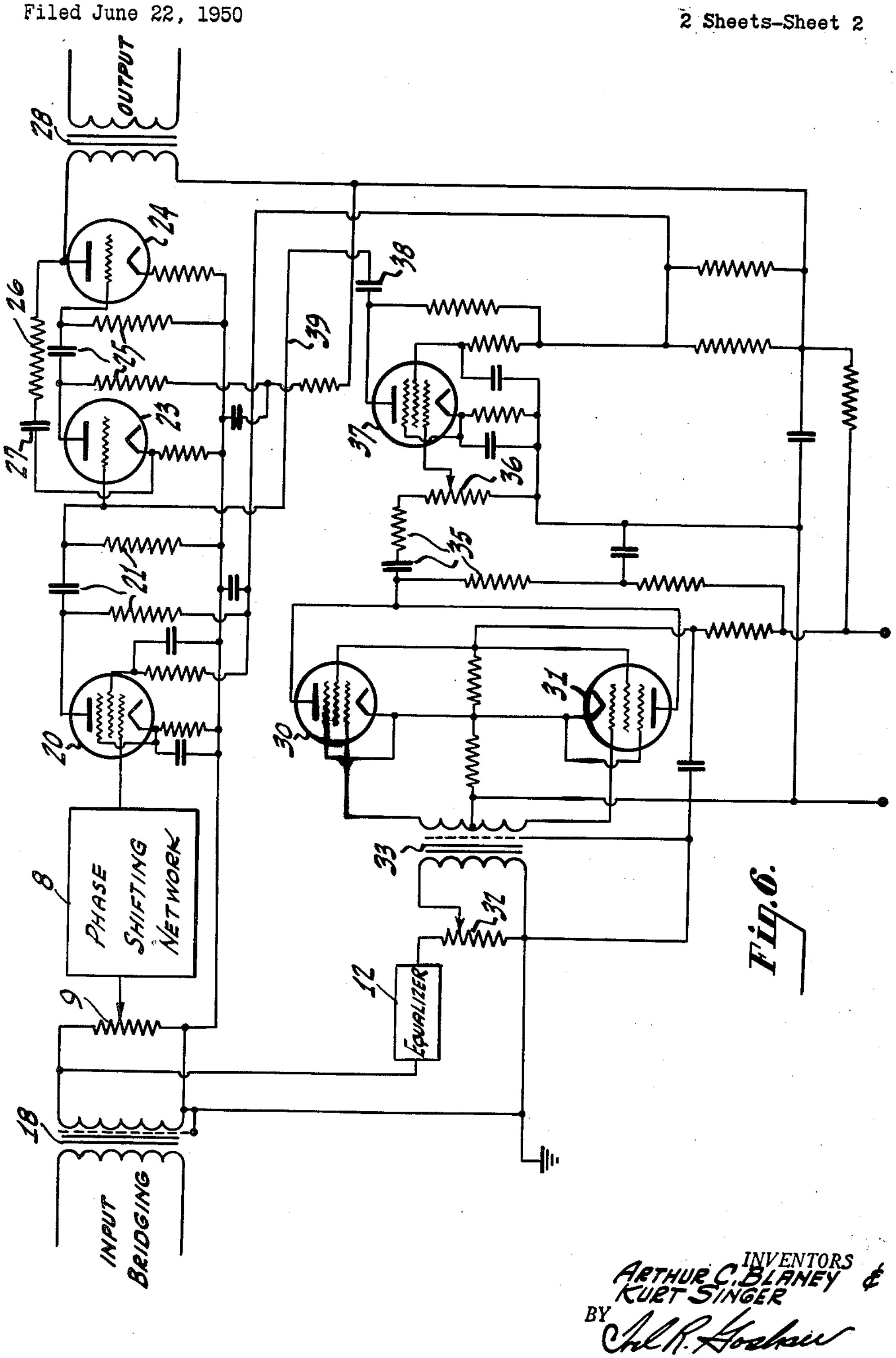
Fig. 6 is a schematic view of a distortion producer or cross modulation compensator used in the invention.

Although such a system as described in Fig. 3 functions fundamentally as required, a circuit such as shown in Fig. 6 provides a more easily controlled relationship between the fundamental and distortion components. This circuit is shown with an input transformer 18 feeding the phase shift network 8 over a potentiometer 9. The equalizer 12 is also fed from transformer 18. The output of the phase shifting network is impressed on a 1620 vacuum tube 20, connected over a resistor-condenser network 21, to a combining network amplifier including two 6SN7 tubes 23 and 24. These tubes are connected over a resistance-condenser network 25 and have a feedback circuit over resistor 26 and condenser 27. Thus, amplifier 20 is an isolation amplifier and amplifier tubes 23 and 24 serve as the combining network 10 of Fig. 1. The output of tube 24 is fed over an output transformer 28.

The distortion producing device is the remainder of the circuit, and is composed of a pair of 6K7 tubes 30 and 31. The output of the equalizer 12 is connected over potentiometer 32 to an input transformer 33, the terminals of the secondary of which are connected to the grids of tubes 30 and 31 in push-pull. However, the plates of tubes 30 and 31 are connected in parallel and over a resistance-condenser network 35 and potentiometer 36 to an amplifier including a 1620 tube 37. The output of tube 37 is fed over a condenser 38 to the grid of combining amplifier tube 23, over condenser 38 and conductor 39. The remainder of the circuit supplies the required voltages to the vacuum tube electrodes as is well-known in the art.

The operation of the compensator shown in Fig. 6 is as described in connection with the prior figures, it being observed that the amplitude of the signal may be controlled by potentiometers 32 and 36. By connecting the input to tubes 30 and 31 in push-pull and the outputs therefrom in parallel, both the fundamental and odd harmonics of the original signal are eliminated, leaving only the even harmonics. In this manner, since the variation in the even harmonics is the signal portion which will generate the difference between curves *a* and *b* and result in curve *c* in Fig. 2, the control of the distortion components is easily obtained in the circuit of Fig. 6. The circuit itself eliminates the fundamental and odd harmonics, so it is only the amplitude in the even harmonics which must be adjusted. After the distortion components have been generated and their amplitudes properly obtained, the phase shift network 8 is then adjusted so that the distortion components are added in the proper phase for impression on the recorder 15.

To illustrate the magnitude of distortion to be added reference is made to Fig. 5. The curve *h* represents the reproduced 400 cycle output from a recorded 9000 cycle carrier modulated with 400 cycles. The film emulsion was developed to a density of 1.42. It is observed that for such film processing, the lowest 400 cycle output of the reproduced 9000 cycle modulated carrier was 36.5 decibels below the 9000 cycle output when the distortion generated by the invention was 6.5 percent. Since a 400 cycle output, thirty decibels below the 9000 cycle carrier output, is considered satisfactory, a 400 cycle output of 36.5 decibels below the carrier conforms to the best negative-positive print processing standards. The equalizer 12 modifies the generated distortion amplitude to compensate for the increase in image spread distortion at the higher frequencies, as discussed above.

We claim:

1. A distortion producing system for a photographic sound recording system, comprising a signal source, a phase shifting unit for said signal connected to said source, an equalizer connected to said source for raising the higher frequency portion of said signal, a distortion generator connected to said equalizer for producing a component equal to the difference between the signal and the variations therefrom introduced by film processing, and a network connected to said distortion generator for combining said component with said phase shifted signal before impression on a photographic film.

2. A distortion producing system in accordance with claim 1, in which said distortion generator includes a pair of vacuum tubes having their inputs connected in a push-pull relationship and their outputs connected in parallel.

3. A sound recording system comprising a source of signals, a photographic sound recorder for recording said signals, a phase adjusting network for shifting the phase of said signals, an equalizer connected to said signal source for attenuating the lower portion of said signal frequencies, a distortion device connected to the output of said equalizer for introducing into said signal a component representing the difference between said signal amplitudes and the variation therefrom introduced by film processing, a combining network connecting said phase adjusting network to said recorder, and means for connecting the output of said distortion producing device to said combining network.

4. A sound recording system in accordance with claim 3, in which said distortion producing device comprises a pair of vacuum tubes, the inputs of which are connected in push-pull to the output of said equalizer, and the outputs of which are connected in parallel to said combining network.

5. A system for photographic sound recording by producing a predetermined electrical wave representing the difference between the actual signal shape and the wave shape required to neutralize emulsion processing distortion, comprising means for generating a signal to be recorded, means for shifting the phase of said signal, means for eliminating the fundamental and odd harmonics of said signal, means for controlling the amplitude of the even harmonics of said signal, means for combining said amplitude controlled even harmonics with said original signal after said original signal has been shifted in phase and means for recording said combination signal.

6. The system in accordance with claim 5, in which an equalizer is provided to raise the high frequency portion of said signal before the elimination of said fundamental and odd harmonics.

7. A system for varying the wave shape of a signal as impressed on a photographic emulsion in which image spread occurs during processing, comprising means for generating a signal to be recorded, means for eliminating the fundamental and odd harmonics of said signal, means for varying the amplitude of the remaining portion of said signal, means for varying the phase of said signal, means for combining said remaining portion with said phase shifted original signal and means for recording said combined signal.

8. The method in accordance with claim 7, in which an equalizer is provided for attenuating the low frequency portion of said signal before said fundamental and odd harmonics are eliminated.

9. A system for sound recording in which a wave-form representing the difference between the wave shape of an original signal and the wave shape of the signal on a photographic film after processing is generated, comprising a photographic recorder, an electrical signal generator for generating a signal to be recorded, a phase shifting network for said signal connected to said generator, a signal combining amplifier connected to said network and said recorder, and an amplifier having its input connected in push-pull to said generator and its output connected in parallel to said combining amplifier.

10. A system in accordance with claim 9, in which an equalizer for attenuating the low frequency portion of said signal is connected between said signal generator and said amplifier.

ARTHUR C. BLANEY.
KURT SINGER.

References Cited in the file of this patent

UNITED STATES PATENTS

| Number | Name | Date |
|---|---|---|
| 2,074,049 | Dimmick | Mar. 16, 1937 |
| 2,105,769 | Hansen | Jan. 18, 1938 |